(12) United States Patent
Keithley et al.

(10) Patent No.: US 8,135,229 B1
(45) Date of Patent: *Mar. 13, 2012

(54) IMAGE PROCESSING METHOD AND DEVICE

(75) Inventors: Douglas G. Keithley, Boise, ID (US); Roy G. Moss, Palo Alto, CA (US)

(73) Assignee: Marvell International Technology Ltd., Hamilton (BM)

(*) Notice: Subject to any disclaimer, the term of this patent is extended or adjusted under 35 U.S.C. 154(b) by 558 days.

This patent is subject to a terminal disclaimer.

(21) Appl. No.: 12/350,771

(22) Filed: Jan. 8, 2009

Related U.S. Application Data (63) Continuation of application No. 10/941,859, filed on Sep. 16, 2004, now Pat. No. 7,483,595.

(51) Int. Cl.
G06K 9/40 (2006.01)
G06K 9/54 (2006.01)
G06F 15/00 (2006.01)

(52) U.S. Cl. .............. 382/260; 382/307; 712/16

(58) Field of Classification Search .............. 382/254, 382/260, 276, 293, 295, 302, 307; 345/559; 712/10, 16, 20, 21, 22
See application file for complete search history.

(56) References Cited

U.S. PATENT DOCUMENTS

| | | | | |
|---|---|---|---|---|
| 5,594,473 A | * | 1/1997 | Miner et al. | 345/600 |
| 6,580,456 B1 | * | 6/2003 | Jacobs | 348/312 |
| 6,961,084 B1 | | 11/2005 | Duncan et al. | |
| 7,126,991 B1 | | 10/2006 | Mimar | |
| 2005/0135700 A1 | | 6/2005 | Anderson | |
| 2005/0172106 A1 | | 8/2005 | Ford et al. | |

* cited by examiner

*Primary Examiner* — Yon Couso (57) ABSTRACT

An image processing method and device for processing multiple rows of pixels of an image simultaneously with a single instruction. The processing includes selecting a pixel window having a plurality of pixels of an image spanning across multiple rows and columns, building vertical and horizontal load registers to include the plurality of pixels of the selected pixel window, and simultaneously processing selected pixels of the plurality of pixels included in the vertical and horizontal load registers using a single instruction, wherein the vertical and horizontal load registers are shifted when the selected pixels are processed. Accordingly, a method and device for efficient processing of an image is provided.

11 Claims, 10 Drawing Sheets

PIXEL
WINDOW 10b

PIXEL
WINDOW 10c

PIXEL
WINDOW 10d

```
                PIXEL
              WINDOW 10h
... 0   0 1 1 1   0 0 0 0 0 0 | 0 0 1 1 1 1 1 1 | 1 1 ...
... 0   0 0 1 1   1 0 0 0 0 0 | 0 1 1 1 1 1 1 0 | 1 1 ...
... 0   0 0 1 1   1 0 0 0 0 0 | 1 1 1 0 0 0 0 0 | 0 1 ...
... 0   0 0 1 0   1 1 0 0 0 1 | 1 1 1 1 1 1 1 0 | 1 1 ...
... 1   0 0 0 0   0 1 1 0 1 1 | 0 0 0 1 1 1 1 1 | 1 1 ...
... 1   0 0 0 0   0 0 1 1 1 0 | 0 0 0 0 1 1 1 1 | 1 1 ...
... 1   0 0 1 1   0 0 0 1 0 0 | 0 0 0 0 1 1 1 1 | 1 1 ...
... 1   0 1 1 1   0 0 0 0 0 0 | 0 0 0 1 1 1 1 1 | 1 1 ...
              ↑                  ↑                  ↑
             30a                30b                30c
```

IMAGE PROCESSING METHOD AND DEVICE

CROSS-REFERENCES TO RELATED APPLICATIONS

This present application is a continuation of U.S. patent application Ser. No. 10/941,859 filed Sep. 16, 2004 titled, "AN IMAGE PROCESSING METHOD AND DEVICE." The specification of said application is hereby incorporated in its entirety, except for those sections, if any, that are inconsistent with this specification.

BACKGROUND OF THE INVENTION

1. Field of the Invention

The present invention relates to processing an image. More particularly, the present invention relates to processing multiple rows of pixels of an image simultaneously with a single instruction.

2. Description of the Related Art

Generally, analyzing and processing of a selected pixel of an image includes building a pixel window having neighboring pixels of the selected pixel and processing the selected pixel with respect to the neighboring pixels in the pixel window. Accordingly, pixels in a pixel window are processed with respect to one another.

A typical hardware implementation of image processing utilizes a large buffer to store multiple pixels of image data. This requires the use of an application specific integrated circuit (ASIC) at a substantial cost for implementation. Further, a typical software based implementation of an imaging process requires multiple instruction cycles for building pixel windows, processing the pixel windows and loading pixels to the pixel windows, thereby consuming a higher processor bandwidth and requiring use of larger and faster processors. Unfortunately, the typical hardware and software solutions for image processing are not cost-efficient.

Accordingly, it is important to provide an image processing method and device without requiring high processor bandwidth. It is also important to provide an image processing method and device to eliminate the need to build pixel windows manually. Therefore, there is a need for executing image processing without having to utilize faster and larger processors.

SUMMARY OF THE INVENTION

The present invention provides a method of processing multiple rows of pixels of an image simultaneously with a single instruction. According to an aspect of the present invention, the processing includes building the multiple rows of pixels of the image in horizontal and vertical load registers that are arranged with respect to each other to correspond with the image.

Further, the processing includes processing of multiple rows of pixels that are stored in non-sequential locations in a memory.

The present invention also provides a method of selecting pixel windows having a plurality of pixels of an image spanning across multiple rows and columns, building vertical and horizontal load registers to include the plurality of pixels of the selected pixel windows, and simultaneously processing selected pixels of the plurality of pixels included in the vertical and horizontal load registers using a single instruction, wherein the vertical and horizontal load registers are shifted when the selected pixels are processed. Further, the shifting of the vertical and horizontal load registers includes shifting a pixel in each of the horizontal load registers into at least one of the vertical load registers when the selected pixels are processed. The present invention also includes changing the plurality of pixels in the selected pixel windows each time the selected pixels are processed.

The present invention also provides an image processing device including a processor for processing multiple rows of pixels of an image simultaneously with a single instruction, where the multiple rows of pixels of the image are arranged in vertical and horizontal load registers. Further, the present invention provides a number of the horizontal and vertical load registers based on an imaging algorithm used.

Further, a method of the present invention includes building vertical and horizontal load registers to include a plurality of pixels of an image spanning across multiple rows and columns, and simultaneously processing selected pixels of the plurality of pixels spanning across the multiple rows using a single instruction, wherein most significant bits of each of the horizontal load registers are shifted into the vertical load registers when the selected pixels of the image are processed, and at least one of the vertical load registers is overwritten.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Reference will now be made in detail to the present embodiments of the present invention, examples of which are illustrated in the accompanying drawings, wherein like reference numerals refer to the like elements throughout. The embodiments are described below to explain the present invention by referring to the figures.

Figure 1:
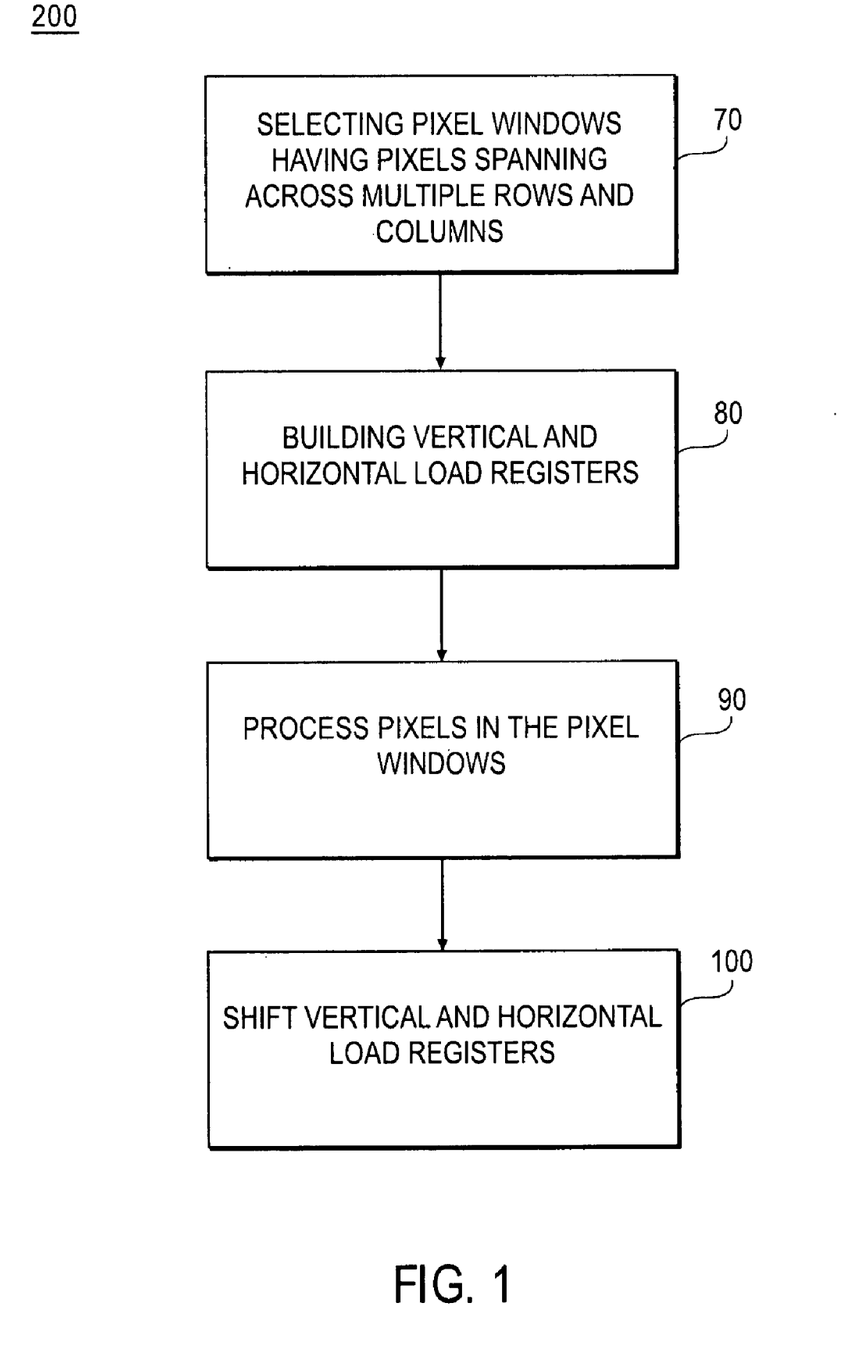
FIG. 1 is a flow chart for illustrating an imaging process, according to an embodiment of the present invention.

FIG. 1 is a flow chart illustrating an imaging process 200, according to an embodiment of the present invention. As shown in FIG. 1, process 200 includes operations 70, 80, 90 and 100. Accordingly, operation 70 includes selecting pixel windows having a plurality of pixels of an image spanning across multiple rows and columns. From operation 70, process 200 moves to operation 80, where vertical and horizontal load registers are built to include the plurality of pixels of the selected pixel windows. From operation 80, process 200 moves to operation 90, where selected pixels of the plurality of pixels included in the vertical and horizontal load registers are simultaneously processed using a single instruction. From operation 90, process 200 moves to operation 100, where the vertical and horizontal load registers are shifted when the selected pixels are processed in operation 90.

Figure 2:
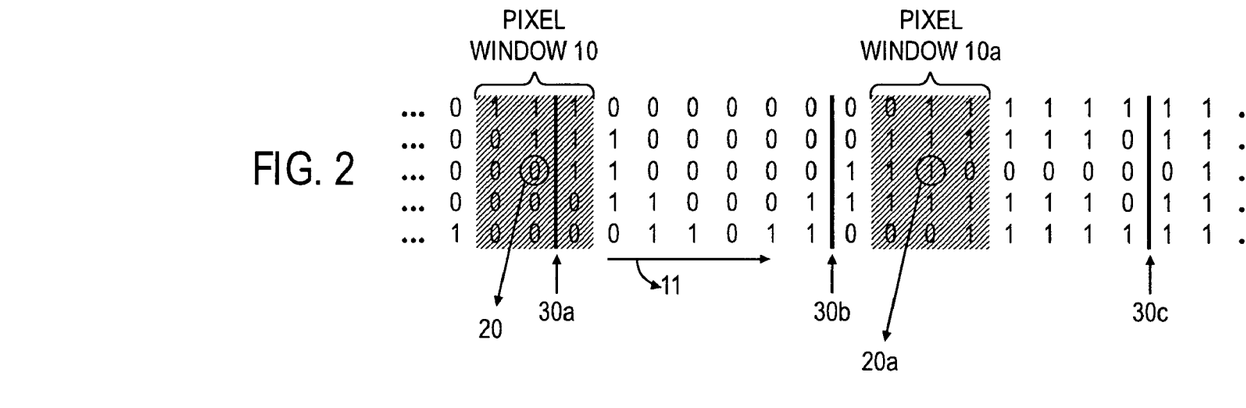
FIG. 2 is a diagram illustrating pixel windows, according to an embodiment of the present invention.

FIG. 2 is a diagram illustrating pixel windows, according to an embodiment of the present invention. FIG. 2 illustrates pixel windows 10 and 10a having a plurality of pixels of an image spanning across multiple rows and columns. The pixel windows 10a and 10b are indicated using gray shading to respectively illustrate pixel contents of the pixel windows 10a and 10b. The pixel windows 10 and 10a are constructed to include neighboring pixels of selected pixels 20 and 20a, respectively, such that processing of pixels 20 and 20a is implemented with respect to corresponding neighboring pixels. For example, the neighboring pixels with respect to pixel 20 are those pixels in rows above and below and pixels in columns to the right and left of pixel 20.

Referring to FIG. 2, the pixel window 10 and 10a include pixels that span across 5 rows and 3 columns. While FIG. 2 is explained using the pixel windows 10 and 10a having pixels that span across 5 pixel rows and 3 pixel columns, the present invention is not limited to this size of a pixel window. For example, 4 pixel rows by 4 pixel columns, 10 pixel rows by 4 pixel columns, etc., can be processed using the present invention. For ease of explanation, it is assumed that each pixel represents one bit, however, the present invention is not limited to such and can be implemented to process pixels having more than one bit.

As shown in FIG. 2, pixels of an image are located within different byte boundaries 30a, 30b and 30c in a memory (not shown). In FIG. 2, pixel window 10a illustrates one of the subsequent positions of pixel window 10 when imaging process 200 of FIG. 1 is applied to pixel window 10, according to an embodiment of the present invention. The pixel window 10 moves or shifts across byte boundaries 30a and 30b as denoted by arrow 11 based on execution of imaging process 200 of FIG. 1. The operation resulting in the shifting of pixel window 10 is described in detail in the following paragraphs.

Figure 3:
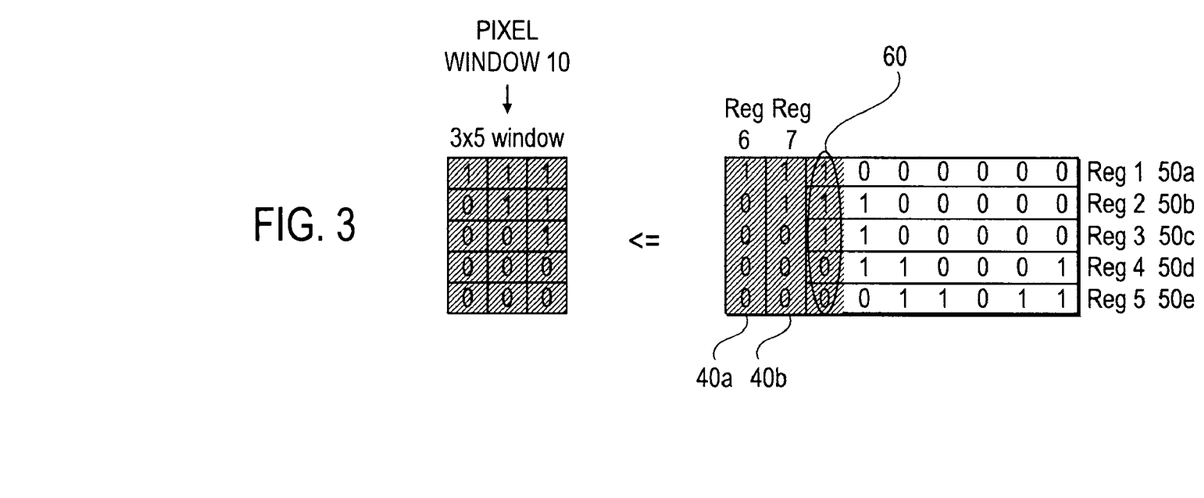
FIG. 3 is a diagram illustrating vertical and horizontal load registers of a pixel window, according to an embodiment of the present invention.

FIG. 3 is a diagram illustrating vertical and horizontal load registers of a pixel window, according to an embodiment of the present invention. In FIG. 3, vertical load registers 40a and 40b and horizontal load registers 50a, 50b, 50c, 50d and 50e are loaded when pixel window 10 is to be processed according to imaging process 200 of FIG. 1. Specifically, horizontal load registers 50a, 50b, 50c, 50d and 50e correspond to registers 1 through 5 (Reg 1 through Reg 5 in FIG. 3). The horizontal load registers 50a, 50b, 50c, 50d and 50e contain all the pixels within byte boundaries 30a and 30b of FIG. 2 while vertical load registers 40a and 40b contain 2 pixel columns prior to byte boundary 30a, which are the remaining pixels in pixel window 10. Most significant bits 60 of the horizontal load registers 50a, 50b, 50c, 50d and 50e are placed closest to the vertical load registers 40a and 40b.

Figures 4A, 4B:
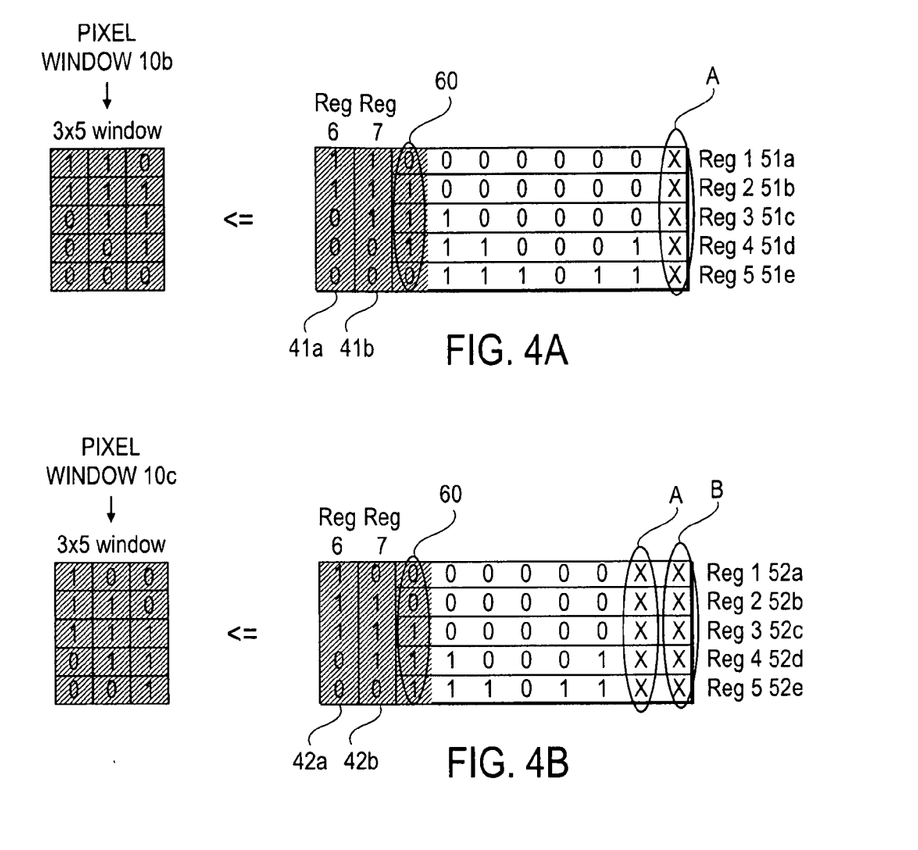
FIGS. 4A, 4B and 4C are diagrams illustrating pixel windows and corresponding vertical and horizontal load registers, according to an embodiment of the present invention.
Figure 4C:
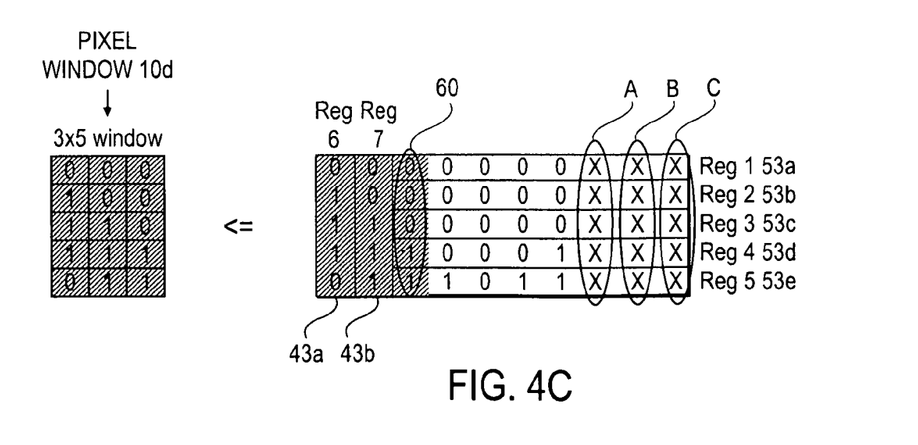

FIGS. 4A, 4B and 4C are diagrams illustrating pixel windows and corresponding vertical and horizontal load registers, according to an embodiment of the present invention. FIG. 4 illustrates application of operation 100 of FIG. 1 to pixel window 10 in FIG. 2. The vertical load registers 40a and 40b and the horizontal load registers 50a, 50b, 50c, 50d and 50e in FIG. 3 are shifted when pixels in pixel window 10 are processed based on operation 90 of imaging process 200 in FIG. 1. Accordingly, when pixel window 10 is processed, pixels in vertical load register 40a in FIG. 3 are overwritten by pixels in vertical load register 40b. Accordingly, the contents of vertical load register 40b are transferred to vertical load register 40a. Further, horizontal load registers 50a, 50b, 50c, 50d and 50e are also shifted to the left so that most significant bits 60 of the horizontal load registers 50a, 50b, 50c, 50d and 50e are transferred to vertical load register 40b.

FIG. 4A shows pixel window 10b that results when pixel window 10 of FIG. 3 is processed and horizontal load registers 50a, 50b, 50c, 50d and 50e and vertical load registers 40a and 40b are all shifted to the left according to imaging process 200 of FIG. 1. As denoted by arrow 11 in FIG. 2, once pixel window 10 is processed resulting in shifting of horizontal load registers 50a, 50b, 50c, 50d and 50e and vertical load registers 40a and 40b, pixel window 10b in FIG. 4A is constructed. Accordingly, pixel contents of horizontal load registers 50a, 50b, 50c, 50d and 50e and vertical load registers 40a and 40b of FIG. 3 changes. As shown in FIG. 4A, horizontal load registers 51a, 51b, 51c, 51d and 51e and vertical load registers 41a and 41b have different pixel contents than horizontal load registers 50a, 50b, 50c, 50d and 50e and vertical load registers 40a and 40b of FIG. 3. Further, when pixel window 10 is processed and pixels in the horizontal load registers 50a, 50b, 50c, 50d and 50e are shifted towards the vertical load registers 40a and 40b in FIG. 3, the resulting horizontal load registers 51a, 51b, 51c, 51d and 51e are loaded with values that are not required for the processing of pixel window 10b. For example, column A containing X values in FIG. 4A illustrates that the last bits of horizontal load registers 51a, 51b, 51c, 51d and 51e contain values that are not required for processing pixel window 10b.

Referring to FIG. 4B, when pixel window 10b of FIG. 4A is processed, horizontal load registers 51a, 51b, 51c, 51d and 51e and vertical load registers 41a and 41b shift to the left, resulting in pixel window 10c as shown in FIG. 4B. Specifically, pixels in vertical load register 41a of FIG. 4A are overwritten by pixels in vertical load register 41b, and the most significant bits 60 of each horizontal load registers 51a, 51b, 51c, 51d and 51e are loaded into vertical load register 41b. As described above, as most significant bits 60 of the horizontal load registers continue to be shifted or transferred to at least one of the vertical load registers, columns A and B in FIG. 4B contain values that are not required for processing of pixel window 10c. Similarly, when horizontal load registers 52a, 52b, 52c, 52d, 52e and vertical load registers 42a and 42b in FIG. 4B are shifted to the left, horizontal load registers 53a, 53b, 53c, 53d, 53e and vertical load registers 43a and 43b result as shown in FIG. 4C. Further, when imaging process 200 is applied to pixel window 10c in FIG. 4B, pixel column and rows of pixel window 10c changes to pixel window 10d, according to an embodiment of the present invention. As illustrated in FIG. 4C, columns A, B and C contain values that are not required for processing pixel window 10d.

Figure 5A:
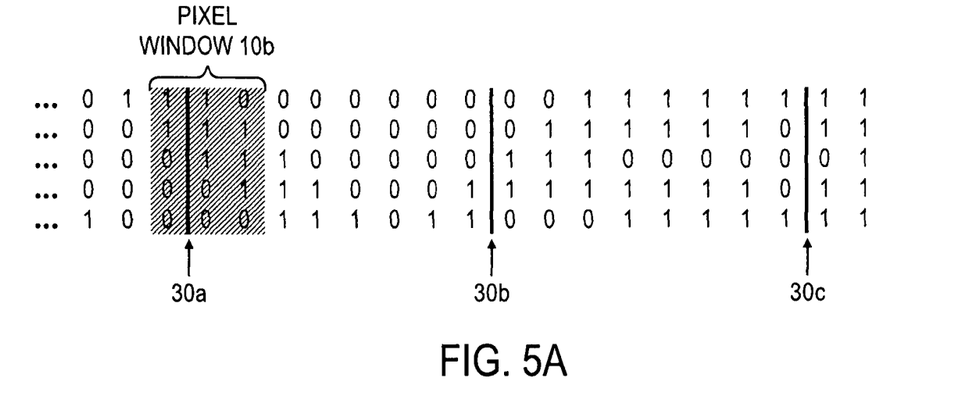
FIGS. 5A, 5B and 5C are diagrams illustrating respective shifting operations of pixel windows of FIGS. 4A, 4B and 4C, according to an embodiment of the present invention.
Figure 5B:
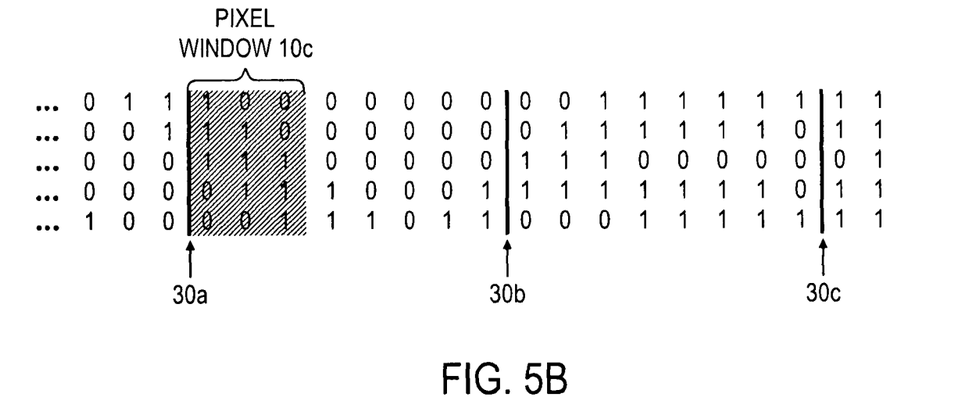
Figure 5C:
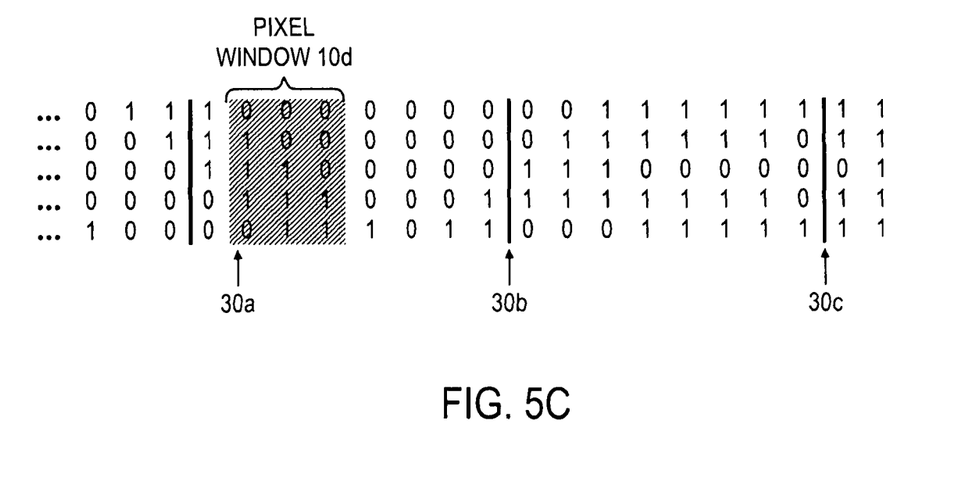

FIGS. 5A, 5B and 5C are diagrams illustrating respective shifting operations of the pixel windows 10b, 10c and 10d of FIGS. 4A, 4B and 4C, according to an embodiment of the present invention. FIG. 5 illustrates the shifting movement of pixel windows upon processing of pixel windows 10, 10b and 10c. Specifically, upon processing pixels in pixel window 10b of FIG. 5A, content of pixel window 10b is sequentially changed to pixel windows 10c and 10d in FIGS. 5B and 5C. As is evident from FIGS. 5A, 5B and 5C, pixel window 10d in FIG. 5C is closer to byte boundary 30b than pixel windows 10b and 10c of FIGS. 5A and 5B.

Figure 6A:
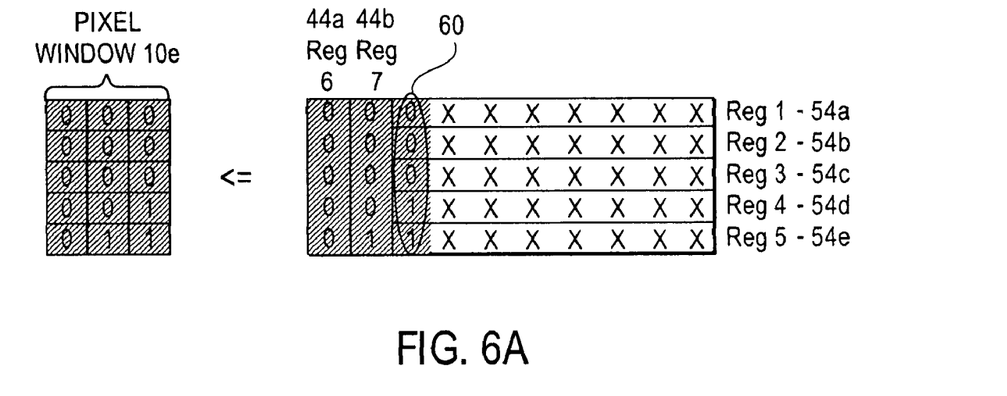
FIGS. 6A and 6B are diagrams illustrating an exemplary pixel window and vertical and horizontal load registers, according to an embodiment of the present invention.
Figure 6B:
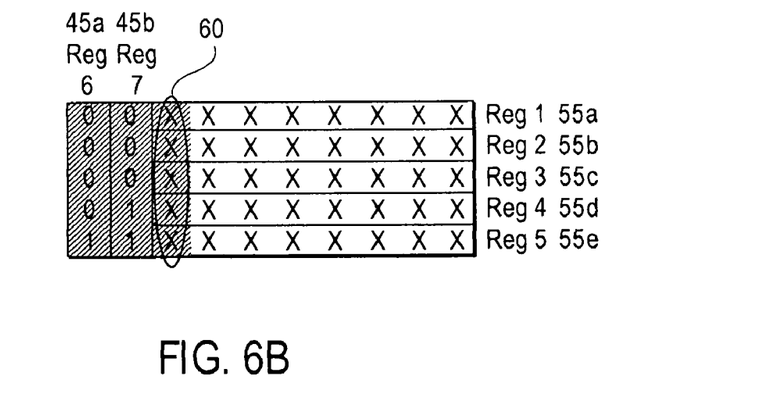

FIGS. 6A and 6B are diagrams illustrating an exemplary pixel window and vertical and horizontal load registers, according to an embodiment of the present invention. In FIG. 6, pixel window 10e is formed of pixels in the last 3 pixel columns before the byte boundary 30b in FIG. 2. As shown in FIG. 6A, horizontal load registers 54a, 54b, 54c, 54d and 54e and vertical registers 44a and 44b are built for pixel window 10e. Then, as shown in FIG. 6B, the vertical load registers 45a and 45b keep getting reloaded with pixels until shifting of all the pixels in horizontal load registers 54a, 54b, 54c, 54d and 54e is completed. According to an embodiment of the present invention, an imaging process 90 is not executed because only vertical load registers 45a and 45b contain pixels while the most significant bits 60 of horizontal load registers 55a, 55b, 55c, 55d and 55e are not loaded with pixels.

Figure 7:
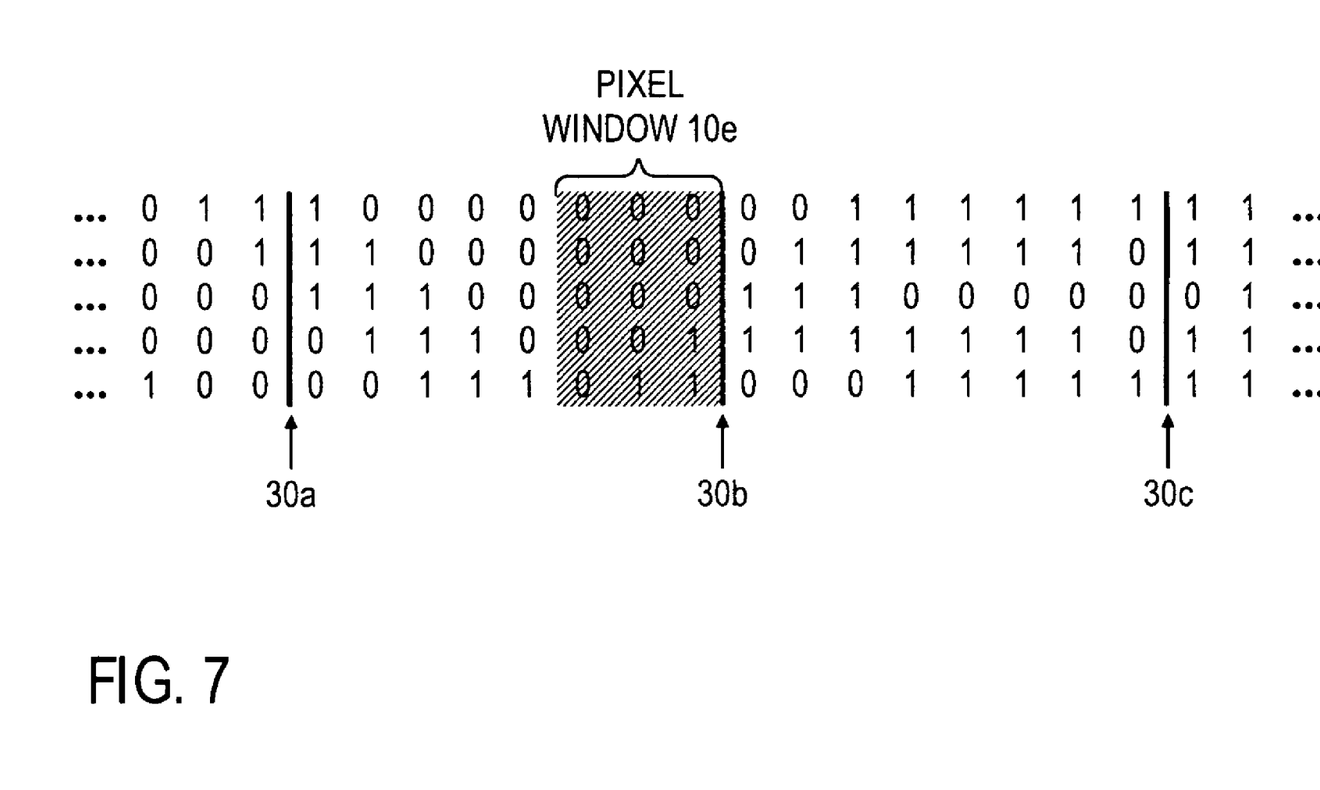
FIG. 7 is a diagram illustrating shifting operation of the pixel window of FIG. 6A, according to an embodiment of the present invention.

FIG. 7 is a diagram illustrating shifting operation of the pixel window be of FIG. 6A, according to an embodiment of the present invention. As mentioned above, pixel window 10e contains the far right three pixel columns within boundary 30a. Accordingly, when operation 90 of FIG. 1 is applied to pixel window 10e, corresponding horizontal load registers 54a, 54b, 54c, 54d and 54e and vertical registers 44a and 44b are shifted to the left so that most significant bits 60 of 54a, 54b, 54c, 54d and 54e in FIG. 6A are transferred to vertical register 44b while pixels in vertical register 44b are shifted to vertical register 44a. Further, when pixel window 10e of FIG. 6A having the last 3 pixel columns before byte boundary 30b is processed and horizontal load registers 55a, 55b, 55c, 55d and 55e and vertical load registers 45a and 45b of FIG. 6B are loaded, pixel columns subsequent to boundary byte 30b continue to be loaded into the horizontal and vertical load registers as described below in relation to FIGS. 8A and 8B.

Figure 8A:
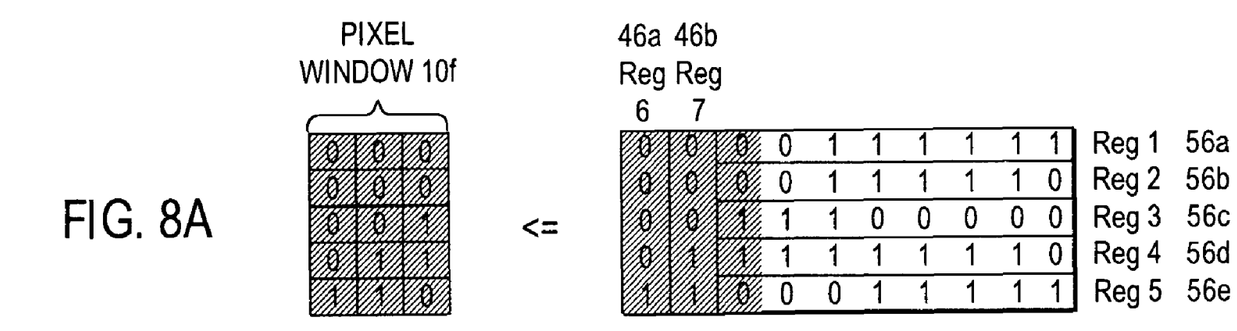
FIGS. 8A and 8B are diagrams illustrating pixel windows and corresponding vertical and horizontal load registers, according to an embodiment of the present invention.
Figure 8B:
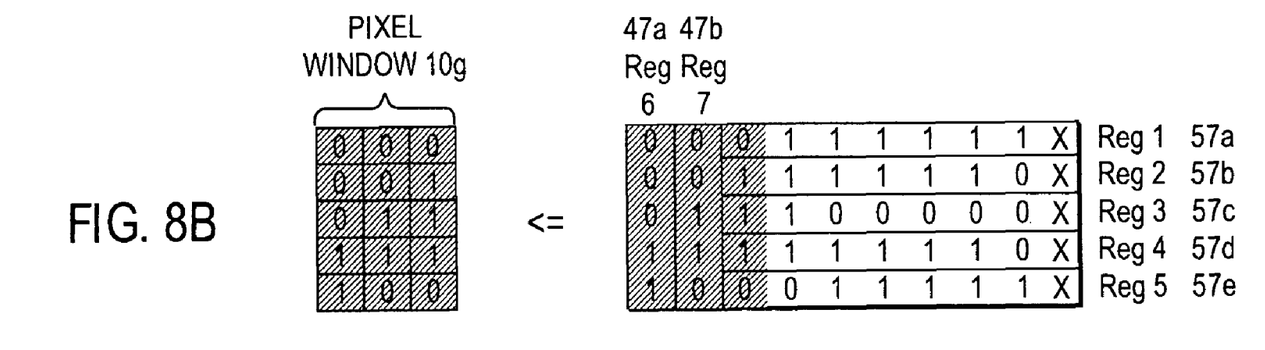
Figure 9A:
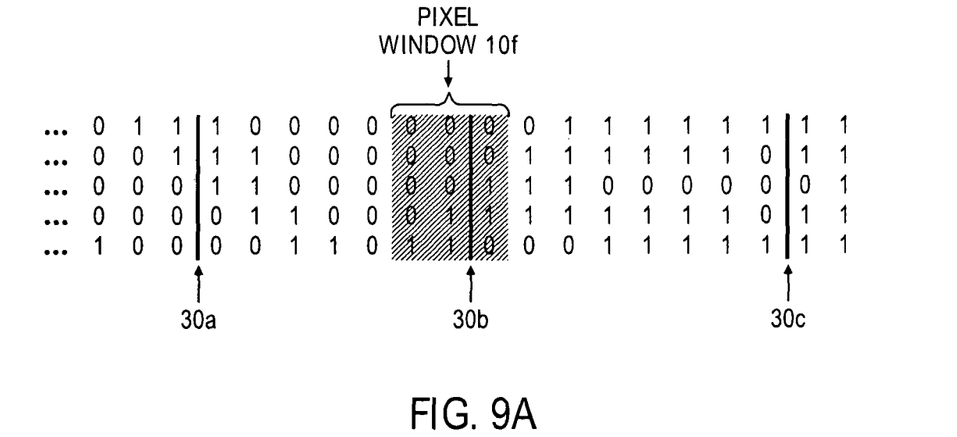
FIGS. 9A and 9B are diagrams illustrating respective shifting operations of pixel windows of FIGS. 8A and 8B, according to an embodiment of the present invention.
Figure 9B:
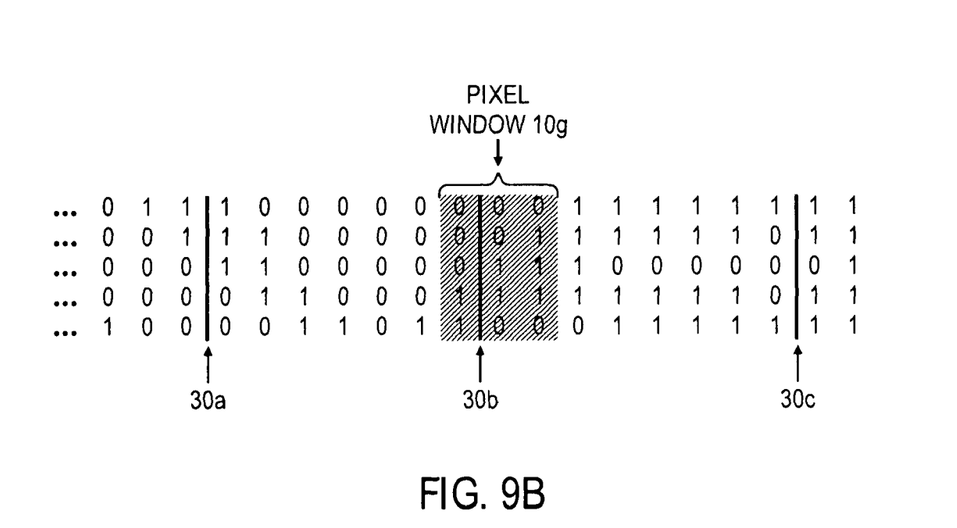

FIGS. 8A and 8B are diagrams illustrating pixel windows and corresponding vertical and horizontal load registers, according to an embodiment of the present invention. FIG. 8A shows pixel window 10f having initial 2 pixel columns from pixel columns before byte boundary 30b and 1 pixel column having pixels after byte boundary 30b as shown in FIG. 9A. Further, FIG. 8B shows pixel window 10g having 1 pixel column before byte boundary 30b and 2 pixel columns after byte boundary 30b as shown in FIG. 9B. As shown in FIGS. 8A and 8B, vertical and horizontal load registers are built for pixel window 10f and pixel window 10g, respectively. For pixel window 10f, horizontal load registers 56a, 56b, 56c, 56d, 56e are constructed, and for pixel window 10g, horizontal load registers 57a, 57b, 57c, 57d, 57e are constructed. Further, vertical load registers 46a, 46b in FIG. 8A and vertical load registers 47a and 47b are respectively constructed for pixel window 10f and pixel window 10g.

As mentioned above, FIG. 9A shows that pixel window 10f has 2 initial pixel columns before byte boundary 30b and 1 pixel column subsequent to byte boundary 30b. And FIG. 9B shows that pixel window 10g has the initial pixel column before byte boundary 30b and 2 pixel columns after byte boundary 30b. Accordingly, FIGS. 9A and 9B show shifting of pixel window 10f to pixel window 10g as imaging process 200 is applied to pixel window 101.

Figure 10:
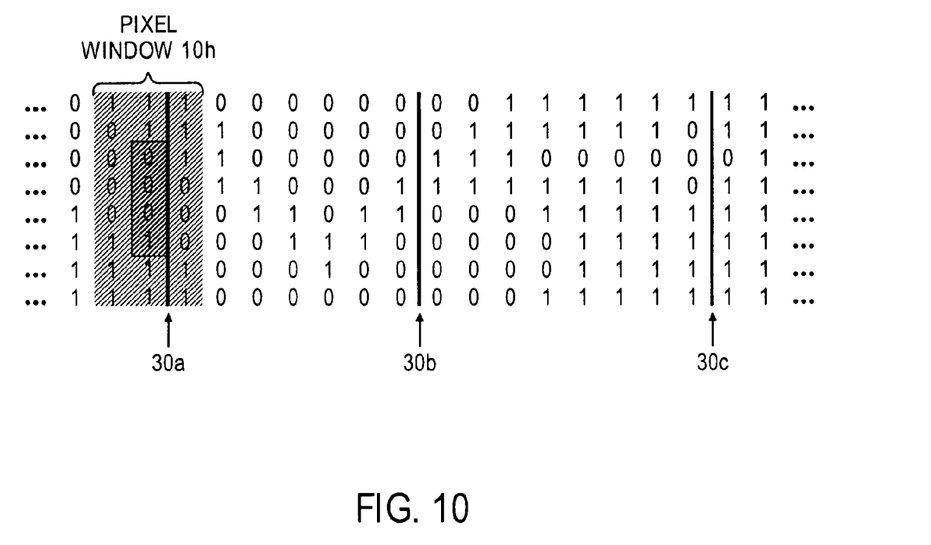
FIG. 10 is a diagram illustrating a pixel window, according to an embodiment of the present invention.

FIG. 10 is a diagram illustrating a pixel window, according to an embodiment of the present invention. As shown in FIG. 10, pixel window 10h has 8 pixel rows by 3 pixel columns. As discussed above, byte boundaries 30a, 30b and 30c represent byte boundaries in a memory within which pixels of an image are stored. While FIG. 10 is explained using pixel window 10h having 8 pixel rows by 3 pixel columns, the present invention is not limited to processing a pixel window of that size.

Figure 11:
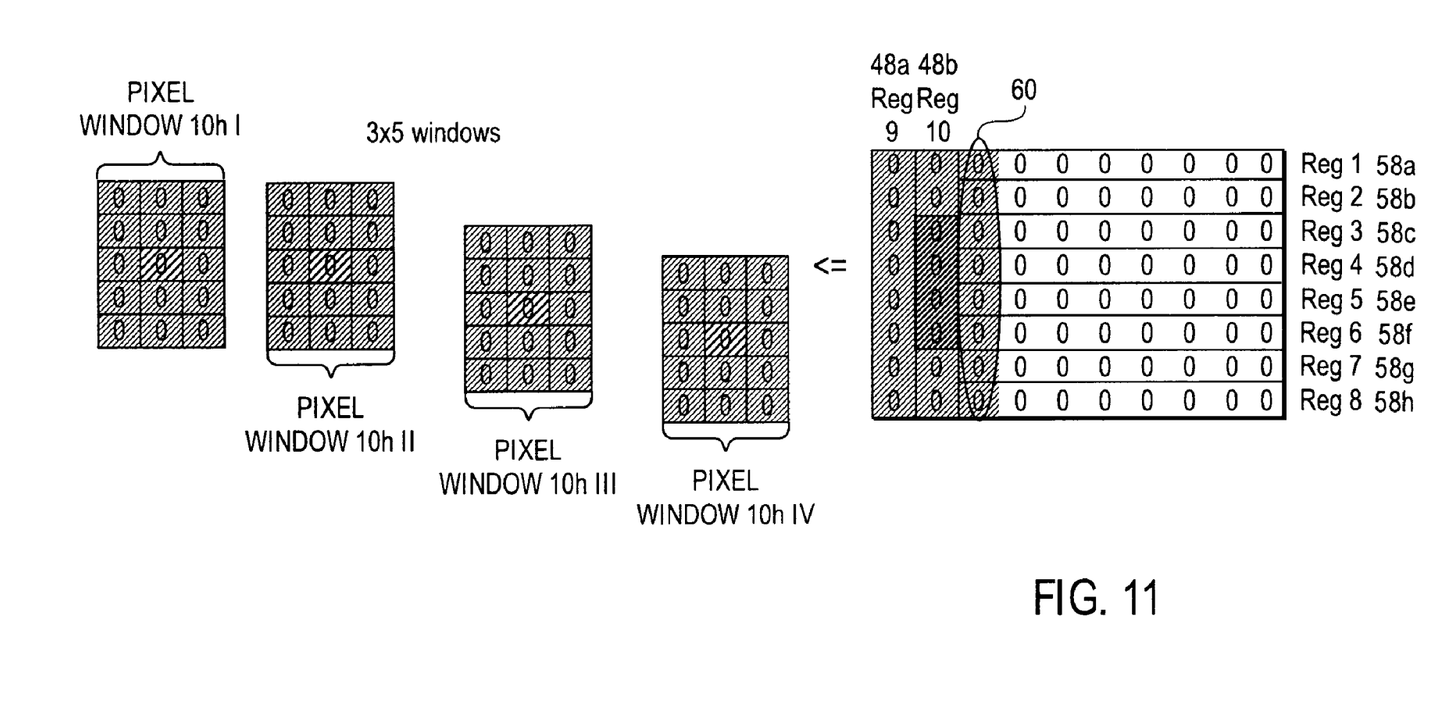
FIG. 11 is a diagram illustrating vertical and horizontal registers of the pixel window of FIG. 10, according to an aspect of the present invention.

FIG. 11 is a diagram illustrating vertical and horizontal registers of the pixel window of FIG. 10, according to an aspect of the present invention. As shown in FIG. 11, multiple pixel windows 10h I, II, III and IV having 3 pixel columns by 5 pixel rows are constructed for pixel window 10h of FIG. 10 that has 8 pixel rows by 3 pixel columns. Accordingly, for each of the multiple pixel windows 10h I, II, III and IV, a corresponding instruction is implemented to process pixel columns and rows in pixel windows 10h I, II, III and IV where only pixel window 10h IV shifts horizontal load registers 58a, 58b, 58c, 58d, 58e, 58f, 58g and 58h and vertical load registers 48a and 48b. This allows the present invention to implement efficient image processing by serially executing multiple pixel windows of a larger pixel window with corresponding instructions. As shown in FIG. 11, horizontal load registers 58a, 58b, 58c, 58d, 58e, 58f, 58g and 58h and vertical load registers 48a and 48b are constructed for pixel window 10h of FIG. 10. Upon processing of pixels in pixel windows 10h IV, most significant bits 60 of horizontal load registers 58a, 58b, 58c, 58d, 58e, 58f, 58g and 58h are shifted into vertical load register 48b. Moreover, pixels in vertical load register 48b are shifted to the left to overwrite pixels of vertical load register 48a. Further, according to another embodiment of the present invention, pixel windows 10h I, II, III and IV are processed simultaneously using a single instruction, causing the horizontal load registers 58a, 58b, 58c, 58d, 58e, 58f, 58g and 58h and the vertical load registers 48a and 48b to be shifted.

For example, central processing units such as, Tensilica XTensa T1050, ARC600 and ARC700, MIPS Pro series can be used to process multiple rows of pixels of an image simultaneously with a single instruction, according to the present invention. However, while the imaging process of the present invention can be utilizing Tensilica XTensa T1050, ARC600 and ARC700, MIPS Pro series central processing units, the present invention is not limited to use by these processing units.

Accordingly, the method of the present invention enables processing of multiple rows of pixels of an image simultaneously with a single instruction. The method further includes selecting a pixel window having a plurality of pixels of an image spanning across multiple rows and columns, building vertical and horizontal load registers to include the plurality of pixels of the selected pixel window, where selected pixels are simultaneously processed and the vertical and horizontal load registers are shifted when the selected pixels are processed.

The present invention also provides processing of multiple rows of pixels that are stored in non-sequential locations in a memory. Further, the present invention includes shifting most significant bits of each of the horizontal load registers into the vertical load registers when the multiple rows of pixels of the image are processed, where at least one of the vertical load registers is overwritten.

The present invention also provides an image processing device having a processor for processing multiple rows of pixels of an image simultaneously with a single instruction, wherein the multiple rows of pixels of the image are arranged in vertical and horizontal load registers. Further, the processing of the multiple rows of pixels of the image includes shifting of the pixels of the image that are arranged in the vertical and horizontal load registers when the multiple rows of pixels are processed.

Additionally, the present invention provides building vertical and horizontal load registers to include a plurality of pixels of an image spanning across multiple rows and columns, and simultaneously processing selected pixels of the plurality of pixels spanning across the multiple rows using a single instruction, wherein most significant bits of each of the horizontal load registers are shifted into the vertical load registers when the selected pixels of the image are processed, and at least one of the vertical load registers is overwritten.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. An image processing device, comprising:
    a processor for processing multiple rows of pixels of an image simultaneously with a single instruction;
    a plurality of horizontal load registers; and
    a plurality of vertical load registers, including a first vertical load register and a second vertical load register;
    wherein the multiple rows of pixels of the image are arranged in (i) the plurality of vertical load registers and (ii) the plurality of horizontal load registers;
    wherein the processor is configured to shift pixels from the first vertical load register to the second vertical load register; and
    wherein the processor is further configured to shift at least one pixel corresponding to a bit of each of the plurality of horizontal load registers into the first vertical load register.

2. The image processing device according to claim 1, wherein the processing includes processing of the multiple rows of pixels of the image that are stored in non-sequential locations in a memory.

3. The image processing device according to claim 1, wherein the multiple rows of pixels of the image are included in a pixel window having pixel columns, and a content of the pixel window changes each time the multiple rows of pixels are processed.

4. The image processing device according to claim 1, wherein a number of the horizontal load registers and a number of the vertical load registers provided are based on an imaging algorithm used.

5. The image processing device according to claim 1, wherein the number of horizontal load registers is equal to the number of pixels stored in the first vertical load register.

6. The image processing device according to claim 1, wherein each of the pixels represents one bit.

7. The image processing device according to claim 1, wherein the plurality of horizontal load registers and the plurality of vertical load registers provided are based on an imaging algorithm used.

8. A method, comprising:
    building (i) a plurality of vertical load registers and (ii) a plurality of horizontal load registers, to include a plurality of pixels of an image spanning across multiple rows and multiple columns; and
    simultaneously processing, by a processor, selected pixels of the plurality of pixels spanning across the multiple rows using a single instruction;
    shifting, by the processor, pixels from a first vertical load register of the plurality of vertical load registers into a second vertical load register of the plurality of vertical load registers; and
    shifting, by the processor, pixels corresponding to bits of each of the plurality of horizontal load registers into the first vertical load register.

9. The method according to claim 8, wherein said shifting pixels of the first vertical load register into the second vertical load register further comprises:
    shifting each of the pixels of the first vertical load register into a corresponding position in the second vertical load register.

10. The method according to claim 8, wherein each of the pixels represents one bit.

11. The method according to claim 8, wherein (i) the plurality of horizontal load registers and (ii) the plurality of vertical load registers provided are based on an imaging algorithm used.

* * * * *